Feb. 27, 1923.
T. MIDGLEY, JR
1,446,984
METHOD OF REVIVIFYING SPENT CATALYSTS AND APPARATUS THEREFOR
Filed Mar. 3, 1919
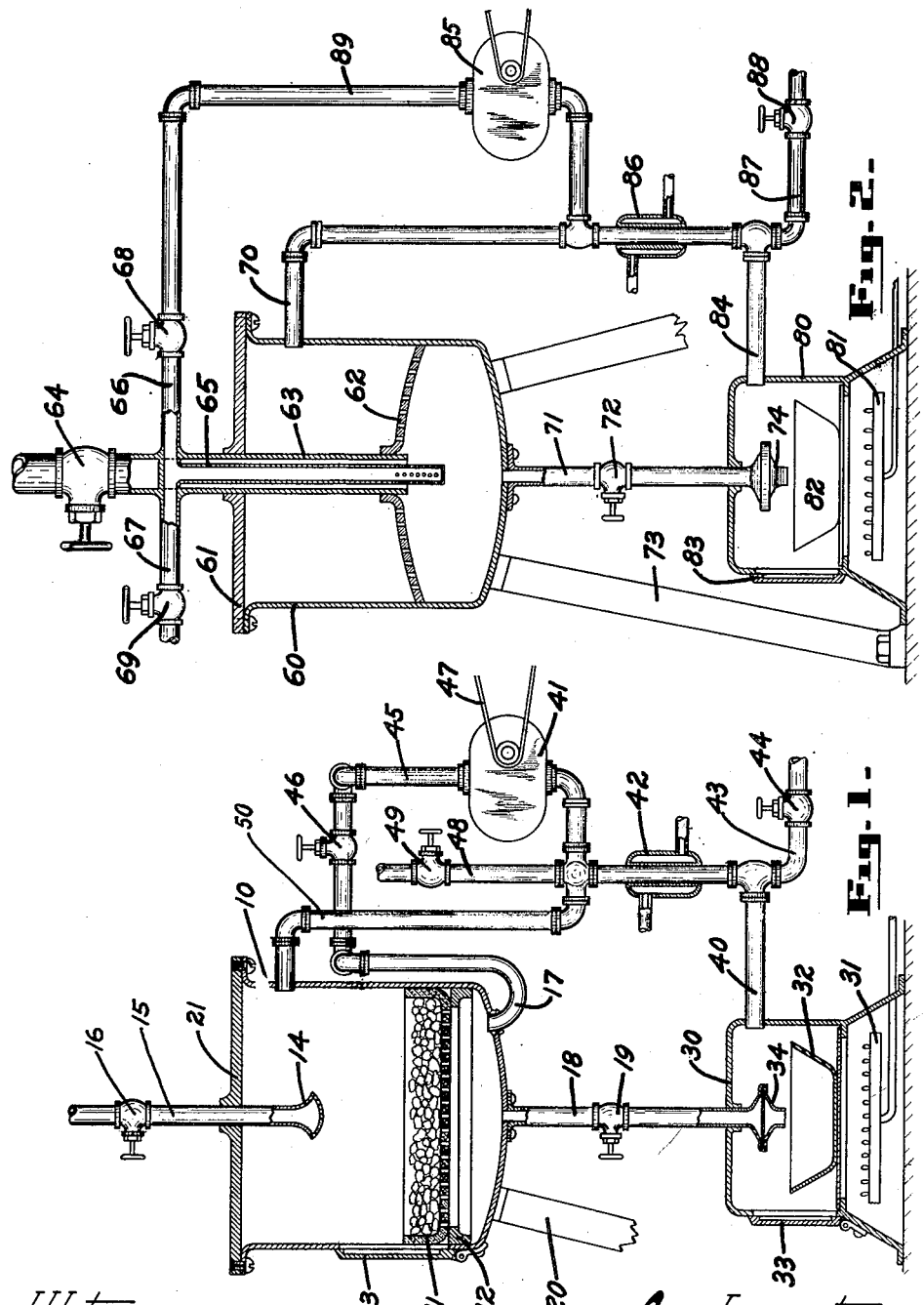

Patented Feb. 27, 1923.

1,446,984

UNITED STATES PATENT OFFICE.

THOMAS MIDGLEY, JR., OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

METHOD OF REVIVIFYING SPENT CATALYSTS AND APPARATUS THEREFOR.

Application filed March 3, 1919. Serial No. 280,211.

*To all whom it may concern:*

Be it known that I, THOMAS MIDGLEY, Jr., a citizen of the United States of America, residing at Dayton, in the county of Montgomery, State of Ohio, have invented certain new and useful Improvements in Methods of Revivifying Spent Catalysts and Apparatus Therefor, of which the following is a full, clear, and exact description.

This invention relates to the treatment of spent catalytic material for the purpose of revivifying such material and restoring it to its original activity and apparatus for carrying out this treatment.

One of the objects of the invention is to treat a spent catalytic material, such for instance as nickel oxide, in such wise as to restore that material to its original catalytic activity.

Another object is to provide a method of revivifying spent catalytic material which is easy of operation and extremely simple and effective in its application.

Still another object of the invention is to provide a simple form of apparatus for carrying out this method of revivification.

Other objects and advantages of the invention will be apparent from the description thereof set out below.

In the drawing in which like reference characters designate like parts throughout the several views thereof, Fig. 1 shows a preferred form, and Fig. 2 a modified form, of apparatus for carrying my invention into effect.

It is a general practice in hydrogenation work to use catalysts such as nickel oxide. Where such a catalyst is used the period of its effective life is limited, inasmuch as practically all materials which are at present subjected to hydrogenation processes contain sufficient quantities of catalyst poisoners to destroy the activity of such catalytic material after a quite limited period of use. I have discovered that spent catalytic material may be so treated that it will be restored to its original activity.

In treating spent catalytic material according to my method I subject the spent catalyst to the action of water and $NO_2$, the result being a nitration of the catalytic material, in the case of nickel oxide the nitration resulting in the formation of nickel nitrate. This nitrated material I then heat to a sufficiently high temperature to break it down and drive off the $NO_2$ as a gas leaving an oxide behind. The oxide thus formed is found, upon subsequent use in hydrogenation processes, to have substantially the same degree of catalytic activity that it had when originally used.

For carrying this method into effect I have devised apparatus which is adapted to permit of either intermittent or continuous revivifying of the spent catalytic material, such apparatus, when used continuously, being adapted to operate upon a limited quantity of $NO_2$. In the form of apparatus illustrated in Fig. 1 a tank or chamber 10 is provided having associated therewith a perforated tray 11 adapted to carry the spent catalytic material to be treated. This tray 11 is carried upon suitable supports 12 and may be readily passed into the tank 10 or removed therefrom through the door 13. Located in the top of the tank 10 is a spray nozzle 14, of any desired form, adapted to receive water from a pipe 15 which is connected to any source of supply of pure water. Located in the pipe 15 is a valve 16 adapted to control the flow of water through the pipe and thus control the quantity of water admitted through the spray nozzle 14. Leading into the tank below the perforated tray 11 is a pipe 17 adapted to admit $NO_2$ from any desired source, the location of the inlet end of the pipe 17 being such that any gas passing therethrough into the tank will tend to pass upwardly through the material on the tray 11, at the same time coming in intimate contact with any water passing downwardly from the nozzle 14. Leading off from the bottom of the tank 10 is a drain pipe 18 controlled by a valve 19. The tank 10 may be supported in any desired manner. In the form of apparatus illustrated it is supported by a plurality of legs 20, only one of which is shown in Fig. 1 of the drawing. The tank also has a detachable top or cover 21, the removal of which permits ready access to the entire interior thereof.

The pipe 18 opens into a heating oven 30 having a heating element 31 cooperating therewith and adapted to receive the vessel 32, which during operation of the device is so placed within the heating oven 30 that any material flowing through the pipe 18 will fall thereinto. The heating oven 30 is provided with a door 33, which may be tightly closed during operation of the device, through which the vessel 32 may be introduced within said oven or removed therefrom. Attached to the lower end of the pipe 18 is a filter 34, of any desired construction. During the reaction within the tank 10 the impurities poisoning the catalytic material will be separated out and these impurities must be removed before the nitrate is changed into the oxide, and the filter 34 is adapted for this purpose. The filter is made of detachable sections to more readily permit of cleaning and to make easier the substitution of new filtering material when desired.

Leading off from the oven 30 adjacent the top thereof is a pipe 40 which, at its other end, opens into the casing of a pump 41. Surrounding the pipe 40 intermediate the heating oven 30 and the pump 41 is a condenser 42 adapted to condense any vapors passing through the pipe 40 to the pump 41. Leading off from the pipe 40 adjacent the condenser 42 is a drain pipe 43, controlled by the valve 44, through which any condensate from the condenser may be removed. The delivery pipe 45 of the pump 41 is connected to the pipe 17, described above, a valve 46 being inserted in such pipe to control flow therethrough. The pump 41 may be of any desired construction and driven in any desired manner, as for instance, by means of a belt 47 connected to some suitable source of power. Leading into the pipe 40 in advance of the pump 41 is a pipe 48, controlled by a valve 49. This pipe is connected to any suitable source of supply of $NO_2$ gas so that if at any time the supply of $NO_2$ gas evolved from the heating oven 30 is not sufficient to maintain the desired reaction within the tank 10, an extra supply may be admitted by proper manipulation of the valve 49. If desired the pipe 48 may open into the pipe 17 adjacent the tank 10, or even into the tank 10 itself, instead of opening into the inlet pipe of the pump. The pipe 50 leads from the top of the tank 10 to the pipe 40, any excess of $NO_2$ supplied to the tank being returned therethrough to the pump and recirculated through the system.

In Fig. 2 I have illustrated a slightly modified form of apparatus adaptd for carrying out this same method of revivification. In this form of apparatus there is a tank 60 having a removable top or cover 61. Situated transversely of the tank and intermediate the top and bottom thereof is a perforated plate or arch 62 of any suitable material, it being merely necessary that the material constituting this arch be inactive with respect to the material to be treated, an arch of earthenware, for example, serving very satisfactorily. Passing through the top of the tank, and through the arch therein, is a pipe 63. This pipe need not extend into the space below the arch, it being merely necessary that it open through the arch so that any material passing therethrough will be discharged below the arch. This pipe 63 is adapted to admit a solution, or mixture, of the spent catalytic material in water, the quantity of solution or mixture admitted therethrough being subject to control by means of the valve 64. Located within the pipe 63 is a smaller pipe 65, the lower end of which is perforated and terminates below the arch 62. This pipe is adapted to admit $NO_2$ and it is desirable that it extend well into the space below the arch so that any gas passing through the perforations in its end will pass through the entire quantity of solution in the tank. Attached to the upper end of the pipe 65 are two pipes 66 and 67, controlled respectively by the valves 68 and 69, and adapted to admit $NO_2$ gas into the tank through the pipe 65. Leading off from the top of the tank, above the surface of the solution therein, is a pipe 70 through which any excess gas entering the tank may escape. Leading off from the bottom of the tank is a drain pipe 71 controlled by a valve 72. The tank is supported in any desired manner, as upon a plurality of legs 73.

The pipe 71 leads into a heating oven 80 having a heating element 81 associating therewith and containing a vessel 82 adapted to be placed in the heating oven and removed therefrom through the door 83. Attached to the lower end of the pipe 71 is a filter 74, identical in structure and function with the filter 34 of Fig. 1. The elements 80, 81, 82 and 83 are also identical in structure with the corresponding elements disclosed in Fig. 1. Leading off from the top of the heating oven 80 is a pipe 84 the opposite end of which opens into the pump 85, this pipe intermediate the heating oven and the pump being surrounded by a condenser 86 and having a drain 87 controlled by a valve 88, the pipe, condenser, pump and drain pipe being identical with the corresponding parts in Fig. 1. The delivery pipe 89 of the pump 85 is connected to the pipe 66, flow from the pump 85 through the pipe 66 being controlled by means of the valve 68. The pipe 70, described above, opens into the pipe 84 in advance af the pump casing so that any gas passing therethrough will be returned to the tank. The pipe 67 is connected to any desired source of $NO_2$ gas and through it suitable quantities of such gas may be admitted when necessary, as, for example, when starting, or where it is merely desired to run the device intermittently without continuous reuse of the same quantity of $NO_2$. Of course, if desired, the pipe 67 may open into the inlet side of the pump, or into any other part of the pump system.

The method of operation of each form of apparatus is substantially the same. In the form of apparatus illustrated in Fig. 1 the spent catalytic material is placed upon the supporting member 11 which is placed within the tank 10. Finely divided water spray and $NO_2$ gas are then admitted into the tank where they react with the spent oxide to generate nitrate, the nitrate in solution passing through the pipe 18 into the vessel 32 within the heating oven, the impurities released during the nitrating reaction being removed, in transit, by the filter or separator 34. The temperature within the heating oven is maintained sufficiently high to decompose the nitrate and drive off the $NO_2$ therefrom. Under the action of the pump 41, the $NO_2$, along with some water vapor, passes through the pipe 40 where the water vapor is condensed and drained off through the pipe 43 while the $NO_2$ is forced by the pump through the pipe 45 and caused to again circulate through the tank 10. The operation of the device is thus obviously continuous, if desired, the same $NO_2$ being used over and over again in carrying on the reaction. In the form of apparatus illustrated in Fig. 2 precisely the same principle of operation is present, the difference in effecting that principle being that a solution of spent catalytic material in water is placed in the tank 60 to start with and the $NO_2$ is then merely bubbled through this solution, the valve 72 being so set that a properly limited quantity of the nitrated solution, which results from the passage of the $NO_2$ gas, flows from the tank 60 into the vessel 82 where it is decomposed into the oxide, the $NO_2$ gas resulting from such decomposition being circulated by means of the pump back into the tank, the operation being thus obviously continuous, as is the case with the apparatus disclosed in Fig. 1, and the $NO_2$ being also used again and again. In this form of apparatus by properly setting the valves 64 and 72 the flow of nitrated solution from the tank may be made commensurate with the rate of reaction therein, and the flow of new solution into the tank may be so governed that the quantity of solution in the tank remains substantially constant. In each of these forms of apparatus it is quite obvious that if desired it may be operated intermittently, and by proper positioning of the valves the pumping apparatus may be entirely eliminated from the operation and all $NO_2$ supplied from an external source.

While the method herein described, and the forms of apparatus for carrying that method into effect, constitute preferred embodiments of the invention, it is to be understood that the invention is not limited to this precise method and these forms of apparatus, and that changes may be made in either without departing from the scope of the invention which is defined in the appended claims.

What I claim is—

1. The method of revivifying spent oxide catalytic material, which consists in treating the spent material with $NO_2$ and water; and heating the resultant treated material.

2. The method of revivifying spent oxide catalytic material, which consists in nitrating the spent material; and heating such nitrated material to drive off $NO_2$.

3. The method of revivifying spent nickel oxide catalysts, which consists in treating the spent material with $NO_2$ and water; and heating the resultant treated material.

4. The method of revivifying spent nickel oxide catalysts, which consists in nitrating the spent material; and heating such nitrated material to drive off $NO_2$.

5. Apparatus for treating spent catalytic material comprising in combination, a treating tank, means for bringing spent catalytic material, water and $NO_2$ into intimate contact within said tank; a heating oven; means connecting the interior of the heating oven with the interior of the treating tank; and means for conveying $NO_2$ gas from the heating oven into the treating tank.

6. Apparatus for treating spent catalytic material comprising in combination, a treating tank, means for bringing spent catalytic material, water and $NO_2$ gas into intimate contact within said tank; a heating oven; a drain pipe connecting the interior of the treating tank and the interior of the heating oven; filtering or separating means within said pipe; and means for conveying $NO_2$ gas from the heating oven into the treating tank.

7. Apparatus for treating spent catalytic material comprising in combination, a treating tank, means for bringing spent catalytic material, water and $NO_2$ gas into intimate contact within said tank; a heating oven; a drain pipe connecting the interior of the treating tank to the interior of the heating oven; filtering or separating means within said pipe; means for conveying $NO_2$ gas from the heating oven into the treating tank; and means for passing $NO_2$ gas from an independent source of supply into the treating tank.

In testimony whereof I affix my signature.

THOMAS MIDGLEY, Jr.

Witnesses:
WALTER W. RIEDEL,
J. W. McDONALD.